(12) United States Patent
Soler

(10) Patent No.: US 7,027,182 B1
(45) Date of Patent: Apr. 11, 2006

(54) PRINTING A TRUE-INK REFERENCE, AND REFINING GRAY ACCURACY, FOR OPTIMUM COLOR CALIBRATION IN INCREMENTAL PRINTING

(75) Inventor: Pau Soler, Barcelona (ES)

(73) Assignee: Hewlett-Packard Development Company, L.P., Houston, TX (US)

( * ) Notice: Subject to any disclaimer, the term of this patent is extended or adjusted under 35 U.S.C. 154(b) by 925 days.

(21) Appl. No.: 09/702,929

(22) Filed: Oct. 31, 2000

(51) Int. Cl.
*G06F 15/00* (2006.01)
*G06K 1/00* (2006.01)

(52) U.S. Cl. .......... 358/1.9; 358/1.9; 358/3.06; 358/3.23; 358/502; 358/503; 347/19; 347/43; 382/165

(58) Field of Classification Search .......... 358/1.9, 358/3.06, 3.23, 502, 503; 347/19, 43; 382/165
See application file for complete search history.

(56) References Cited

U.S. PATENT DOCUMENTS

| | | | | |
|---|---|---|---|---|
| 5,331,438 A | * | 7/1994 | Harrington | 358/500 |
| 5,347,369 A | * | 9/1994 | Harrington | 358/401 |
| 5,363,318 A | * | 11/1994 | McCauley | 702/85 |
| 5,995,714 A | * | 11/1999 | Hadley et al. | 358/1.9 |
| 6,027,201 A | * | 2/2000 | Edge | 347/19 |
| 6,331,042 B1 | * | 12/2001 | Yamada | 347/19 |

\* cited by examiner

*Primary Examiner*—Kimberly Williams
*Assistant Examiner*—Michael Burleson
(74) *Attorney, Agent, or Firm*—Peter I. Lippman

(57) ABSTRACT

Ramps are printed with ink of a particular color, and also nominally in that color but by inks of other colors. A measured actual-ink ramp is a standard to fix the other-colors ramp, and correct other printing in those colors. In one aspect a particular color is gray, actual ink black (K), and other-color inks magenta (M), yellow (Y) and cyan (C). In another aspect, actual ink is red (R), green (G) or blue (B); other colors M, Y and C in respective pairs. For gray/black, the K ramp is a zero-chroma standard to lower composite-black (cK) chroma below ~2.5 ΔE. A sampling aspect prints for each gray tone plural cK-ink combinations preferably bracketing nominal gray values; and searches these for one nearest the particular gray—or most closely bracketing it, for interpolation—for best match. Bracketing is best optimized, by a color-space pattern centered on nominal. Other aspects are taught.

19 Claims, 8 Drawing Sheets

PRINTING A TRUE-INK REFERENCE, AND REFINING GRAY ACCURACY, FOR OPTIMUM COLOR CALIBRATION IN INCREMENTAL PRINTING

RELATED PATENT DOCUMENTS

Closely related documents include coowned U.S. utility patents and applications—all hereby incorporated by reference in their entirety into this document. One is U.S. Pat. No. 5,991,055 of Haselby et al., entitled "UNDERPULSED SCANNER WITH VARIABLE SCAN SPEED, P. W. M. COLOR BALANCE, SCAN MODES AND COLUMN REVERSAL" and of interest here for its discussion of pulsed lamps of different colors, in color sensing. Another such document is application Ser. No. 08/960,766 of Bockman et al., entitled "CONSTRUCTING DEVICE-STATE TABLES FOR INKJET PRINTING" and relevant for its teaching of gray neutrality as a criterion for color calibration at the gray axis and throughout the gamut—and issued as U.S. Pat. No. 6,178,008. A third related document is application Ser. No. 09/183,819 of Baker, entitled "COLOR-CALIBRATION SENSOR SYSTEM FOR INCREMENTAL PRINTING", pertinent by virtue of its teaching of an auxiliary carriage and other variant components for use in calibration—and issued as U.S. Pat. No. 6,832,824. Another somewhat related document is U.S. Pat. No. 5,657,137 of Perumal, entitled "COLOR DIGITAL HALFTONING USING BLACK AND SECONDARY COLOR REPLACEMENT", which takes up the processes of composite-black replacement and substitution.

FIELD OF THE INVENTION

This invention relates generally to devices and procedures for incremental printing of text or graphics on printing media such as paper, transparency stock, or other glossy media; and more particularly to a scanning thermal-inkjet machine and method that construct text or images from individual ink spots created on a printing medium, in a pixel array. The invention is applicable to various kinds of printing devices including facsimile machines and copiers as well as printers.

Such "incremental" printing may be accomplished by passing a single, full-page-width array (or one such array for each of plural colorants) of marking elements continuously along the length of a printing medium—or passing the length of the medium under the array. Incremental printing may instead be accomplished by passing a smaller array (or again one for each of plural colorants) across the width of the medium multiple times, in a process often called "scanning"—the medium being advanced under the scanning path or axis, between passes—to create a swath or partial swath of marks in each pass.

In present-day commercial apparatus the grid is commonly a rectangular pattern of columns and rows, but for purposes of this document need not be. For example a hexagonal pixel-grid pattern appears straightforwardly workable; and the invention would be applicable even in far more remote grid forms, e.g. polar. The invention employs a colorant of a true black or secondary color as a standard for correcting gray neutrality (absence of chroma) or hue accuracy, respectively, of printing with three or two superposed primary colorants.

BACKGROUND OF THE INVENTION (a) Color calibration and correction—Color calibration is a known function in color printers. Its objective is to provide consistency of color within an image, and among all images printed by a given printer, and from printer to printer.

Thus a proper color-calibration algorithm (CCA) compensates for printer deviations in such a way that the same nominal colorant values—i.e. quantities of cyan (C), magenta (M), and yellow (Y) ink, and black (K) if present—produce the same output from any printer which undergoes the calibration. It is helpful to consider a CCA as influencing 366, 368 (FIG. 15) a color-correction stage 365, or the breakpoints 367 (i.e. the threshold values) used in rendition, or both.

Conventional color correction, sometimes referred to as a "transfer function", is a one-dimensional mapping (FIG. 16) for each colorant 381–84 respectively. In eight-bit data processing for incremental-printing systems, ordinarily the color-correction mapping is from eight bits of nominal colorant (C, M, or Y, or K if present) to eight bits of printer-specific colorant.

Various ways of forming a color-correction mapping are known. In some products of the Hewlett Packard Company, such mappings have been configured with the specific aim of preserving the linearity of the colorants C, M and Y—and again K if present.

Experiments have shown, however, that linearity of colorants, while providing an adequate solution for certain kinds of color variations such as those caused by drop-weight fluctuation, nevertheless has distinct limitations. These limitations are particularly troublesome for inkjet printing. First, when primary colorants exhibit a hue shift—such as often caused, with certain media, by high humidity—the primary-linearity technique helps only very little.

Second, this technique fails to ensure a critical condition which is a hallmark of highest-quality printing systems: gray neutrality, or in other words absence of chroma, in nominally gray image features printed as combinations of the primary chromatic colorants C, M and Y.

(b) Composite or process black and gray—It is well known that combinations of these three subtractive chromatic primaries produce a close approximation to black, often called "process black". In the incremental-printing industry, composite/process black or gray when occurring outside highlight regions is usually replaced by actual black ink when available.

The object of such replacement is to reduce both ink usage and the volume of liquid deposited on the printing medium—and also to circumvent possible problems due to inaccuracy of the process-black approximation to actual black. Not all incremental-printing devices, however, have true-black ink cartridges. Therefore, in some such devices, composite black is the only way to achieve any black, and in such systems the accuracy of the process-black approximation assumes greater importance.

In incremental printing an important use of process black, or more precisely process gray, is for the benefit of its mechanical capability to spread or distribute, over a broader image area, colorant that appears neutral to the eye (see the Perumal document mentioned earlier). In this case the chromatic primaries are not overprinted but rather are adjacent—or even scattered rather widely—so that the overall impression of the visually integrated dots is of a smoother or silkier texture, though still one of a very light gray. Therefore, in this rather sophisticated case, process gray is important even if actual black ink is available.

(c) Inaccuracy—When used with less finesse, however, process black—particularly in incremental printing—tends more toward being merely inaccurate. Discerning observers detect some faint hue, some chromatic component, in image areas that are nominally gray.

This chromatic component arises from imperfectly balanced proportions of the three subtractive primary colorants. The idea of "perfectly balanced proportions" unfortunately is ephemeral, because ideal proportions actually vary with the chemical and calorimetric characteristics of the specific colorants employed.

Ideal proportions also vary with the electromechanical characteristics of the printheads used to apply the colorants to the printing medium. All these factors typically vary from batch to batch of colorants and heads.

Furthermore these characteristics interact in confounding ways with characteristics of the printing medium, and of the sequence and even the timing of colorant deposition—and these characteristics interact with each other as well. The difficulty does not stop there, as ambient conditions including temperature and humidity also interact with the foregoing factors to prevent any stable, single set of simple weight or volume proportions from being usable over the life of a printing device.

The hue that appears in nominally gray regions, being uncontrolled, is most typically irrelevant to the subject matter of the particular image features. Esthetically, therefore, it can often be quite jarring.

In perhaps more-technical terms, what is being perceived is nonzero chroma. Colors that should be on the central black-white axis of a theoretical perceptual color space are instead reproduced slightly off-axis in one or another direction within that space.

Such effects are least conspicuous in shadow and highlight regions, where chroma is very difficult to detect visually anyway. They are most obtrusive in midtone regions, where chroma and hue are dominant characteristics of human perception.

In incremental printing it is relatively rare for artists to specify any particular inking effects for particular regions of an image. At least when using low-end systems it is rather difficult even to gain access to controls for such effects.

Instead the admixtures of physical colorants are simply left to the machine, without differentiation as to the specific subject matter. Therefore most incremental printing is particularly vulnerable to the adverse effects of process black used unskillfully.

(d) Earlier correction of process-black chroma—It is accordingly of particular importance that when process black is used it be accurately black—that is to say accurately neutral, nonchromatic. As noted above, however, the configuring of color-correction mappings to preserve linearity in primary-colorant ramps fails to provide this characteristic.

Some earlier products of the Hewlett Packard Company use a color-correction mapping which is embodied in a calibration lookup table (see Bockman, mentioned above). The table is formulated in the laboratory, most typically before a production line opens for a particular product. In field operation, such a table is then read by a system that is open-loop as to chroma—i.e., a system with no feedback of field-measured gray-neutrality information to the color-correction stage.

Other such products do print, measure and respond to color test patterns in the field, but not with respect to actual neutrality of nominally neutral patches made with composite black/gray. More specifically, it is known to canvass or assay generally throughout an entire device gamut, approximating much of a color space. Although some colors thus sampled and measured may be near the neutral axis, this technique essentially approaches neutrality on an incidental basis, and the actual neutrality of grays achieved is correspondingly catch-as-catch-can.

It is also known—essentially as an opposite extreme—to step through colorimetric measurement of individual-colorant ramps. This technique seeks to approach the overall calibration as a matter of linearity of such ramps, as suggested earlier. Without more, this method as well yields inconsistent grays.

(e) Composite secondaries, and inaccuracy—Colors that are well known as additive primaries in video work (where all effects arise as colored lights) occur instead as "secondaries" in printing (where all effects arise from subtractive primary colorants). In printing therefore red, green and blue are secondary colors, usually generated by adjacent or superposed yellow plus magenta, yellow plus cyan, and cyan plus magenta, respectively.

The accuracy of each secondary accordingly depends upon accuracy of the proportions of the subtractive primaries used. For instance the accuracy of red, formed from yellow and magenta, depends upon the accuracy of proportions of the yellow and magenta colorants used.

Here too, as in the foregoing process-black discussion, the definition of "accuracy of proportions" is a very elusive concept because optimum proportions really depend upon a complex of attributes, including those of the colorants, colorant-application devices, printing medium, deposition sequence and timing, temperature and humidity. Nevertheless, just as there is a clear definition of what is meant by "gray neutrality", it is possible to fashion clear (if spectrally complicated) definitions of what is meant by "red", "green" and "blue".

When these colors are not produced accurately, the resulting esthetic impression can be even more troublesome than slight chroma within regions that are nominally gray. This is so for two reasons.

First, only limited sorts of objects in color photos depend for their realism upon total absence of chroma. Second, inaccuracies in the color secondaries manifest themselves as hue shifts, to which observers typically respond by saying that the colors are "off".

Results can be especially conspicuous in flesh tones that have a strikingly unnatural cast, or in other objects of well-known but inaccurately rendered hue that observers may describe as "wrong". Earlier efforts to deal with the problem of inaccurate secondaries have suffered either from complete absence of secondary-accuracy feedback information or—in systems that rely on field spectral measurements using wideband sensing—at least from absence of reliable hue references for those colors.

(f) Conclusion—Chroma appearing in nominally gray regions, and secondary-color hue errors, have continued to impede achievement of uniformly excellent inkjet printing. Thus important aspects of the technology used in the field of the invention remain amenable to useful refinement.

SUMMARY OF THE DISCLOSURE

The present invention introduces such refinement. Before presenting a relatively formal introduction of the invention, it may be helpful to mention some insights that are considered part of the inventive process.

The process-black miscalibration problem discussed above arises precisely from the previously mentioned independence of the prior-art mappings for the different colorants. In such mapping regimes there is no place to introduce crosscomparisons, and associated adjustments—to remove the subtle intrusions of residual chroma which can become so conspicuous in particular midtone features.

Similarly as to secondary colors that appear "off" or "wrong", conventional mapping schemes rely on wideband sensing. Such measurements can go awry because of various different effects.

One class of errors arises from metameric effects. For instance, these types of measurement may implicitly assume that the colorant has a particular spectral-reflectance curve—which may in fact be very different from that of the colorants being used. The sensor system in the printing device integrates the reflected colors differently than does the human visual mechanism.

It will be understood that the invention as practiced and as defined in the appended claims does not rely for its validity or utility upon correctness of these comments. Now with these observations in mind, this discussion will turn to a somewhat more-rigorous presentation.

In its preferred embodiments, the present invention has several aspects or facets that can be used independently, although they are preferably employed together to optimize their benefits.

In preferred embodiments of a first of its facets or aspects, the invention is a method for color-calibrating a printing device. The method includes the steps of using the printing device to print a gray ramp with black ink, and using the same printing device to print a nominally gray ramp with composite-black ink.

In addition the method includes the step of measuring and comparing the printed gray ramps. A further step is employing the measured black-ink ramp as a standard to correct the measured composite-black ramp.

The foregoing may represent a description or definition of the first aspect or facet of the invention in its broadest or most general form. Even as couched in these broad terms, however, it can be seen that this facet of the invention importantly advances the art.

In particular, this method enables a printing system to find the needed actually neutral combination not only very precisely but also with relatively high assurance of accuracy. This is because the system will closely match the composite coloration to the actual black-ink values, which are essentially unquestioned. The system carries its neutral standard along with it, in actual physical form.

Although the first major aspect of the invention thus significantly advances the art, nevertheless to optimize enjoyment of its benefits preferably the invention is practiced in conjunction with certain additional features or characteristics. In particular, preferably all the steps are performed automatically.

Also preferably the employing step includes treating the black-ink ramp as a zero-chroma standard to correct chroma found in the composite-black ramp. A third preference is using the compared black-ink and composite-black ramps to also correct other printing with composite black.

In this latter case there is a subpreference. It is that the method further use the compared black-ink and composite-black ramps to also correct other colors to be printed by the printer.

Yet another basic preference is that the using step with composite-black ink include printing, for a particular gray tonal level, plural combinations of nonblack inks; and in this case it is still further preferable that the plural combinations of nonblack inks substantially bracket nominal values for the particular gray value.

To this last-mentioned preference there are two separate subpreferences, namely that the employing step (or the measuring and comparing step) include searching the printed and measured plural combinations of nonblack inks to find, respectively:

a combination that is nearest the corresponding particular gray value; or instead at least two combinations that bracket a corresponding particular gray value—and then interpolating among the at least two combinations to determine an optimal combination for matching the corresponding particular gray value.

In the case of this second subpreference, the bracketing is preferably optimized. Optimized bracketing in turn preferably includes printing with the plural combinations of nonblack inks that surround the nominal value in a pattern, in color space, that is substantially centered on the nominal value.

Now reverting to the above-mentioned basic preference of printing plural combinations of nonblack inks for a particular gray tonal level, another subpreference is that the employing (or the measuring and comparing) step include searching the printed and measured plural combinations of nonblack inks to find a combination that is nearest a corresponding particular gray value.

Yet another basic preference is that the measuring and comparing step (and/or the employing step) include inserting measured values of the printed gray ramps into equations representing a calorimetric model of the printer, and solving the equations to derive correction values for use in adjusting ink signals in future printing. A subpreference is that the colorimetric equations be solved by iteration.

A particularly preferred form of these calorimetric equations includes plural multiplicative expressions:

$$H(t,n,a)=D(t,n)\cdot E(t,n)\cdot \ldots \cdot F(t,n), \qquad [1]$$

wherein H is a composite or hybrid color printed by use of at least two constituent colors, D is one of the constituent colors, E is another of the constituent colors, " . . . " represents possible additional constituent colors of the at least two, F is a correction factor, t is a tonal level at which H, D, E and " . . . " are evaluated, n is a sensor channel at which all the above are evaluated, and a is a scaling factor that relates overall range of the hybrid color with overall range of the constituent colors.

When these equations are used, preferably in some of the expressions, H=cK, D=$S_1$ and E=$S_2$, where cK is composite black and $S_1$ and $S_2$ are secondaries; and in others of the expressions, H=S, D=$P_1$ and E=$P_2$, where S is a secondary and $P_1$ and $P_2$ are primaries. In this case, still further preferably, in the others of the expressions a=1.

Although the equations in multiplicative form are particularly preferred, another favored general form is instead additive, for example —

$$H(t,n,a)=D(t,n)+E(t,n)\cdot F(t,n)+E'(t,n)\cdot F'(t,n)+ \qquad [2]$$

In preferred embodiments of its second major independent facet or aspect, the invention is a self-calibrating color printer. The printer includes some means for printing a nominally gray ramp using composite black. For purposes of generality and breadth in discussing the invention, these means may be called the "composite-black using means" or simply the "using means".

The printer also includes some means for measuring the printed ramp in at least two different spectral bands respectively. Again for breadth and generality these means will be called the "measuring means".

In addition the printer includes a programmed processor for modifying subsequent operation of the printer to substantially compensate for any nonzero chroma in the printed nominally gray ramp. As will be understood, the programmed processor for performing this function may take the form of portions of one or more processors that manage the whole operation of the entire printer.

The foregoing may represent a description or definition of the second aspect or facet of the invention in its broadest or most general form. Even as couched in these broad terms, however, it can be seen that this facet of the invention importantly advances the art.

In particular, this document earlier points out that, on the one hand, calorimetric measurement of individual-colorant ramps is known; and that on the other hand colorimetric measurement aiming to assay generally over an entire colorspace or gamut is known. A composite-black ramp as such serves much better to probe and establish actual gray neutrality than either of those diametrical prior techniques.

Furthermore, specifically testing the nominally neutral ramp for chroma—i.e. for neutrality as such—not only far more effectively develops information for achieving grays that are substantially free of chromatic cast. In addition these grays in turn form a sturdy and reliable central-axis chromatic backbone for accurate color surrounding that axis.

Although the second major aspect of the invention thus significantly advances the art, nevertheless to optimize enjoyment of its benefits preferably the invention is practiced in conjunction with certain additional features or characteristics. In particular, preferably the measuring means include means for measuring the printed ramp in at least three different spectral bands. While something can be accomplished using two, and it is believed novel and unobvious to do so, results with three bands are very superior.

It is also preferable that the measuring means include at least two different lamps for illuminating the printed ramp, and at least one sensor for detecting lamp illumination reflected from the printed ramp. In this case it is further preferable that those lamps be light-emitting diodes, emitting different colors respectively.

Another basic preference—in essence alternative to the one just described—is that the measuring means include means for illuminating the printed ramp in at least two spectral bands, and at least one sensor for detecting illumination reflected from the printed ramp in those spectral bands separately. In this case it is further preferable that the illuminating means include a lamp emitting in the two or more spectral bands; and that the sensor include spatially, temporally or absorptively selective means for separating illumination from the at least two spectral bands.

An additional basic preference is that the programmed processor include compensation means for adjusting subsequent operation to substantially minimize chroma in printing of nominal gray. In this case a further preference is that the compensation means include means for reducing chroma, in printing of nominal gray, to $\Delta E$ of approximately 2.5 or less. The notation "$\Delta E$" represents the color distance in the CIEL*a*b* space.

In preferred embodiments of its third major independent facet or aspect, the invention is a method for automatically color-calibrating a printer The method includes the step of using the printer to print a ramp in a particular color with actual ink of that color.

In addition the method includes using the same printer to print a ramp nominally in the particular color but with inks of other colors; and then measuring and comparing the printed ramps. Yet another step is using the measured actual-ink ramp as a standard to calibrate and correct the measured other-colors-ink ramp—and also to correct other printing with those other colors.

The foregoing may represent a description or definition of the third aspect or facet of the invention in its broadest or most general form. Even as couched in these broad terms, however, it can be seen that this facet of the invention importantly advances the art.

In particular, this aspect of the invention more broadly provides benefits analogous to those discussed above for the first aspect. These benefits are provided now with respect to precision, accuracy and reliability of composite secondaries, as well as composite black.

Although the third major aspect of the invention thus significantly advances the art, nevertheless to optimize enjoyment of its benefits preferably the invention is practiced in conjunction with certain additional features or characteristics. In particular, preferably the actual ink is red ink, green ink, or blue ink—and the inks of other colors are magenta ink and yellow ink in combination, or yellow ink and cyan ink in combination, or cyan ink and magenta ink in combination.

In preferred embodiments of its fourth major independent facet or aspect, the invention is a method for automatically color-calibrating a printer. The method comprises the steps of modeling an actual color-reproduction system of the printer in a color space that is transformed by contraction.

The contraction brings the machine-primary color axes closer to neutral gray. Another step of the method is performing a color calibration in the contracted model of the printer color-reproduction system.

Still another step of the method is applying a reverse transform to reexpand the calibration results. That is, the calibration is expressed in terms of the actual color-reproduction system of the printer.

The foregoing may represent a description or definition of the fourth aspect or facet of the invention in its broadest or most general form. Even as couched in these broad terms, however, it can be seen that this facet of the invention importantly advances the art.

In particular, by operating in a contracted machine space this facet of the invention enables the calibration procedure to operate much more finely. This method thereby yields a more precise and generally more accurate overall result.

Although the fourth major aspect of the invention thus significantly advances the art, nevertheless to optimize enjoyment of its benefits preferably the invention is practiced in conjunction with certain additional features or characteristics. In particular, preferably this facet of the invention is practiced in conjunction with the first three, introduced above.

All of the foregoing operational principles and advantages of the present invention will be more fully appreciated upon consideration of the following detailed description, with reference to the appended drawings, of which:

DETAILED DESCRIPTION OF THE PREFERRED EMBODIMENTS

1. Gray Neutrality as a Color-Correction Standard

Experiments have shown that building the transfer functions in such a way as to establish gray neutrality foremost, instead of individual-primary linearity, yields better results. In particular, remarkably, the previously mentioned extreme sensitivity of colors to humidity is greatly reduced.

Furthermore, as mentioned earlier, gray neutrality is itself a desired property of the printer. With this technique this property is ensured.

Figure 11:
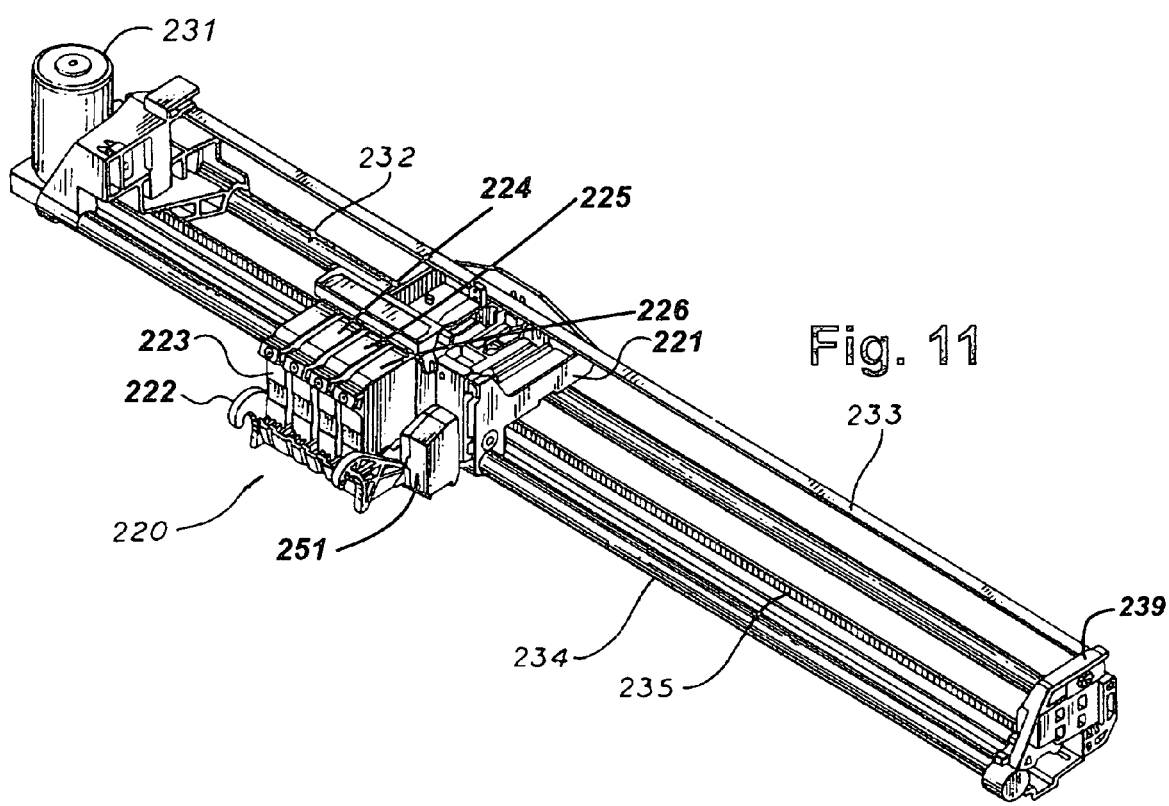
FIG. 11 is a like drawing of the scanning subsystem which carries printheads and a sensor across the printing medium in the FIG. 10 device.
Figure 12:
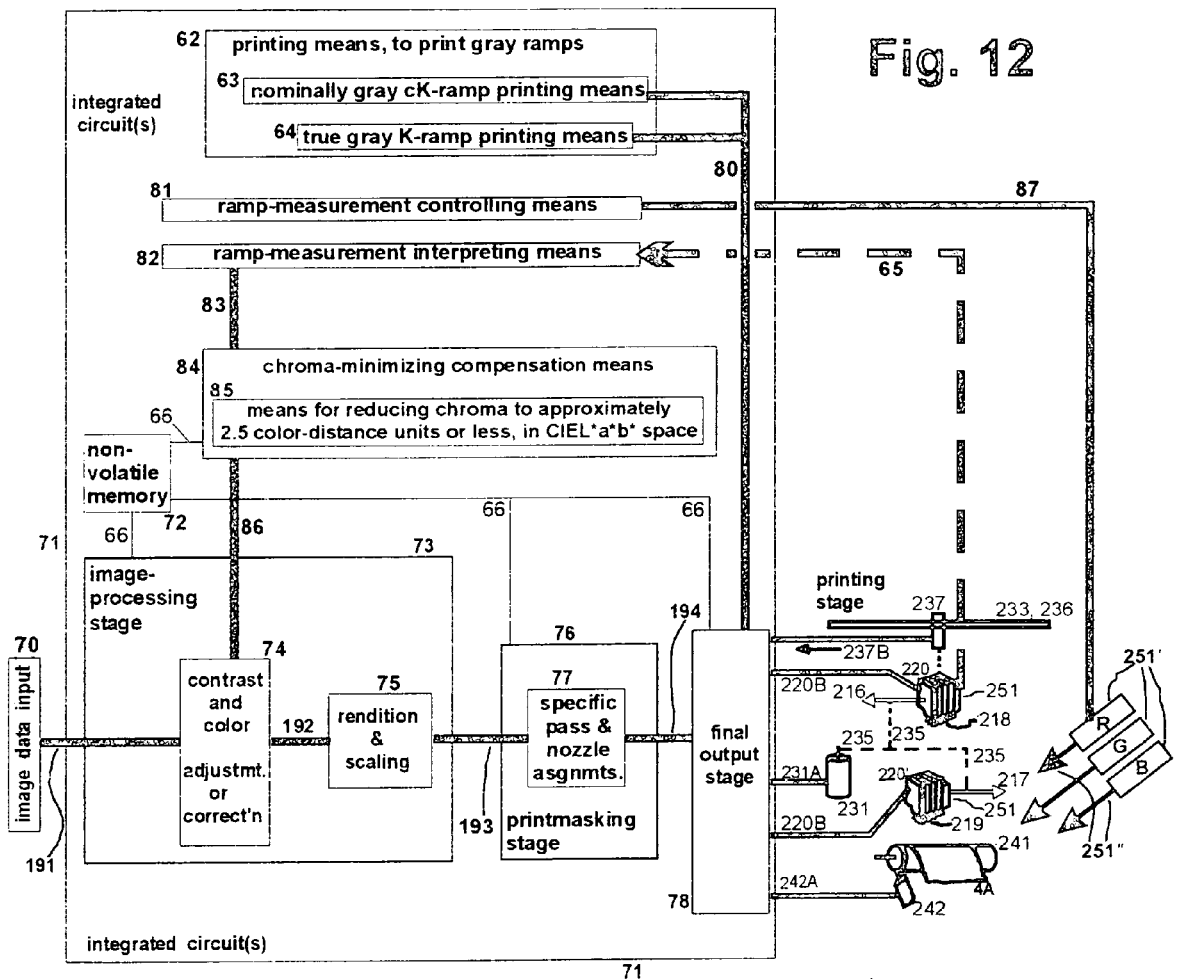
FIG. 12 is a block-diagrammatic representation of a hardware system, incorporating the FIGS. 10 and 11 printer/plotter, according to the invention.
Figure 13:
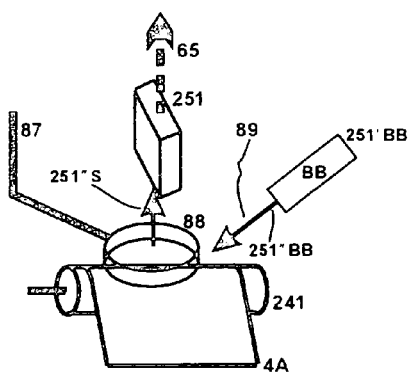
FIG. 13 is a partial view with an alternative sensor.

The gray-neutrality approach, like some prior methods, is reliant upon comparative measurements of just-printed test patterns—using a sensor 251 (FIGS. 11 through 13). As a matter of convenience, in printing devices of the scanning type the sensor is most typically mounted on the carriage 220 which holds the printheads.

Figure 4:
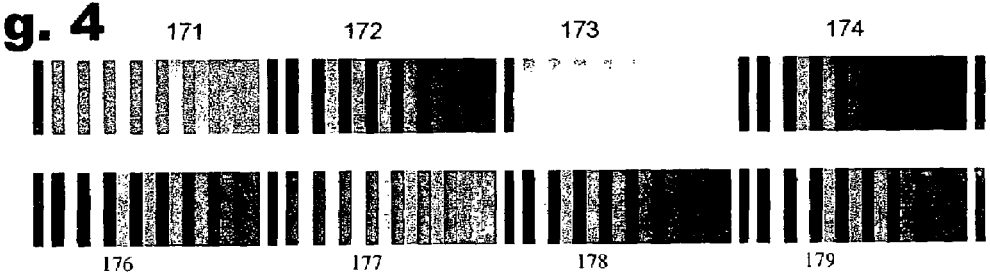
FIG. 4 is a test pattern with primary ramps (in the top row) of cyan, magenta, yellow and black—followed by composite ramps, in the bottom row, of red (yellow plus magenta), green (cyan plus yellow), blue (magenta plus cyan) and black (all three primaries)

This arrangement enables positioning of the sensor automatically over any part of the test pattern (FIG. 1 or 4) on the printing medium 4A (FIGS. 12, 13). It is a particularly advantageous arrangement in that many printing devices already carry a so-called "line sensor" on the carriage, for use in alignment, edge tracking and so on.

Thus use of the already-available line sensor makes double duty of that component, achieving additional functionality at substantially no cost. The line sensor, however, is not necessarily an ideal choice: it is designed for simple geometrical measurements and not optimized for colorimetry.

The previously mentioned Baker document teaches alternatives such as use of an auxiliary carriage with a sensor of finer quality. Depending on the importance of calorimetric accuracy in a particular printing device, the line sensor may be entirely adequate.

In operation, a true-black ramp e.g. 174 (also seen as individual patches 101) is measured and compared with approximations using composite black 179 (also 111, 121–25, 131–35). The composite-black approximation is then very delicately refined to approach the true-black ramp very precisely.

This refinement, maintained (in effect, propagated) throughout the gamut of the printing device, constitutes the desired calibration for use in all subsequent printing until the next calibration. Two alternative ways of calibrating, both based on this principle, are described in the two subsections that follow.

For purposes of this document, preferably a three-lamp (typically three-LED) sensor 251, 251' (FIG. 12) is in use, but as detailed below a single broadband lamp 251'BB (FIG. 13) may be substituted as preferred. Before the calibration procedure itself is started, the true-black ramp should be linearized using conventional linearization techniques or better.

2. Complete Sampling (a) General procedure—This may be regarded as the most straightforward method for performing the gray-neutrality calibration:

A black patch 101 (FIG. 1) is printed and measured, for a particular tonal level (in the illustrated example, fifty percent).

A sampling 111, 121–125, 131–135 of the composite black nominally near the same level, including small variations 121–125, 131–135 in all colorant dimensions (C, M, Y), is printed and measured.

The most similar composite-black patch e.g. 123 is chosen as the corrected value.

The number of patches to be printed is at least $3^3=27$, corresponding to at least three colorants (C, M, Y) and at least three states (+, =, − or in words "high", "nominal" and "low").

The sampling can be grosser or finer, and some simple interpolation (e.g. linear or cubic) can be performed to improve the accuracy. Thus more than three states may be sampled (for instance ++, +, =, − and −−).

The printing system may have more than three chromatic colorants, as for example including dilute magenta and dilute cyan. If so, it is advisable to include the additional colorants in the calibration procedure.

The same procedure is repeated for as many points as desired (usually between eight and sixteen), along the gray gamut from black nearly to white. In this way the full gray-scale range is adjusted. Next the transfer functions are calculated based on these correction values.

(b) Range—The black and composite-black ranges may not be, and usually are not, the same. Most commonly the true-black gamut extends further toward the dark end of the gray axis than does composite black.

To resolve this range misfit, the system does not attempt to match equal densities, e.g. fifty percent composite black with fifty percent true black. Instead a rescaling is performed—to match one hundred percent of composite black against e.g. eighty percent of true black.

(c) Centerpoint, sampling shape and sequencing—It is very likely that the correct combination of C, M and Y that yields gray is quite far from equal amounts of those primaries. Therefore it may be very inefficient to performing sampling that is centered on equal amounts.

To improve efficiency, and in some cases accuracy as well, the tendency of the prior points (for instance, they may all be ten percent and higher for one primary) may be extrapolated. For example, if there is always a need for slightly more magenta, the sampling may be centered at +5% magenta at the outset.

Further, the sampling in CMY space need not be cubical, i.e. +/=/− for each of the three inks. It can also be a sphere, a pyramid, or any other geometrical arrangement that provides a reasonable sampling of the colorant space around or near the nominal combination of values.

If desired the search for best neutral match can be further refined by iteration, with different increments of sampling. At each pass, the solutions are used as new centerpoints.

In other words, a first pass may be performed with ±10% variation about zero (or about e.g. +5% magenta as suggested above), yielding a best solution. A new pass is then performed with ±5% variation about that best solution from the first pass, yielding a new best solution—and so on for some specified number of iterations or until the solution converges to some specified precision.

(d) Advantages: robustness, minimum storage—In addition to the benefits of the gray-neutrality on its own, the algorithms discussed here are particularly resistant to LED variations. This is due to the fact that the interpretation of all measurements is relative rather than absolute.

Because all the corrections are based upon relative rather than absolute quantities, practice of the invention requires no LED characterization table or the like. The only constraint is that the illumination be approximately a partition of the visible spectrum.

3. Modeling

Modeling is in essence a tactic for reducing the number of patches to be measured, by invoking some accurate process of estimation. This tactic reduces the time required for printing and measuring, along with the quantities of printing medium and colorant required.

Many models are possible. The general technique of modeling for other predictive or corrective purposes, however, is known; hence people skilled in this field will find the simple examples discussed here adequate to guide practice of the present invention.

Figure 3:
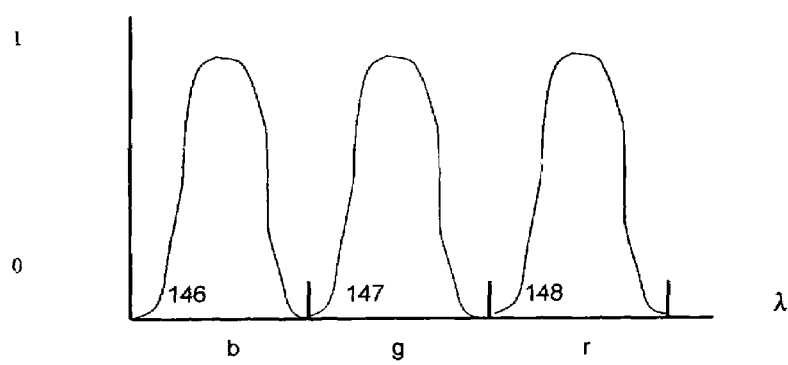
FIG. 3 is a conceptual graph showing representative spectral sensitivities in the three sensor channels.

(a) Measurement—If a three-LED sensor (e.g. line sensor)—or broadband illumination with three-band spectral differentiation—is used, the sensing system can be regarded as a three-broadband spectral detector with three main channels: red 146 (FIG. 3), green 147 and blue 148. In preferred embodiment of the invention, this detector measures reflected light from a test pattern made up of pure-colorant ramps 171–174 (FIG. 4) and composite ramps 176–179.

The pure-colorant part of the pattern includes one ramp each for cyan 171, magenta 172, yellow 173 and black 174.

The composite part includes one ramp each for red (a magenta-plus-yellow composite) 176, green (cyan plus yellow) 177, blue (cyan plus magenta) 178 and black (cyan plus magenta plus yellow) 179.

With each sensor channel in turn—i.e., with each LED—the system measures the chromatic primaries (CMY), the secondaries (R=M+Y, G=Y+C, B=C+M), the composite-black (cK=C+M+Y) and the black (K) ramps. It is a matter of operational convenience and design choice whether the entire pattern is measured with each sensor channel before moving on to the next sensor channel, or instead the measurements in all three channels are performed in each part of the pattern before proceeding to the next part of the pattern.

The latter approach, however, is generally preferable as a practical matter, since flashing LEDs through a cycle (see Haselby) can be accomplished very quickly—requiring no mechanical movement of the printhead carriage or printing-medium advance drive. If desired, such measurements can be made while the mechanical systems are in motion (incurring an accuracy penalty due to measuring different portions of each patch, in the different spectral bands). Hence cycling through the LEDs, at each patch, in principle can provide an entire measurement-data array with just one slow pass over each row of the test pattern.

(b) Meaning of the data—In each printer the results of the ramp measurements will be a family of numerical tabulations, i.e. data arrays —

$$C = C(\underline{t}, \underline{n}) \quad [3]$$
$$M = M(\underline{t}, \underline{n})$$
$$Y = Y(\underline{t}, \underline{n})$$

in which $\underline{t}$ is the nominal tonal value, along the ramp, for which each measurement is made (often expressed as a colorant percentage or fraction), and $\underline{n}$ the sensor channel ($\underline{r}, \underline{g}, \underline{b}$) used to make the measurement.

At the outset, these data represent simply the numerical value of reflectance uniquely corresponding to each specified combination of ramp position and channel. That is to say, at this stage the $\underline{t}$ and $\underline{n}$ values are the independent variables, and the C, M, Y values, the dependent.

It is helpful, however, to look ahead to the end of the process and keep in mind that the values of $\underline{t}$—when later divorced from channel indices $\underline{n}=\underline{r}, \underline{g}, \underline{b}$ and also when referred to the primary colorants CMY of the printing system rather than the sensor channels $\underline{r}, \underline{g}, \underline{b}$—will become the dependent variables that will be sought as the end result of the calibration process. In particular these numbers $\underline{t}$ are the tonal values which the printing stage must be instructed to produce, to obtain particular tonal values of gray:

$$t_C = t(t_K) \quad [4]$$
$$t_M = t(t_K)$$
$$t_Y = t(t_K).$$

In general this correspondence will not be an equality. In other words when a particular tonal value $t_K$ of gray is desired, the printing device must in general be directed to produce some other tonal values $t_C, t_M, t_Y$ of C, M and Y respectively —

$$t_C \neq t_K \quad [5]$$
$$t_M \neq t_K$$
$$t_Y \neq t_K$$

and this inequality in fact is why calibration is needed.

Now with the perspective in mind that the tonal-value numbers $t$ will be the variables sought, it can be correspondingly appreciated that the photometric-measurement numbers C, M, Y—

$$C = C(t, \underline{n}) \quad [6]$$
$$M = M(t, \underline{n})$$
$$Y = Y(t, \underline{n})$$

will later be the data to be read from the tabulations, in the final steps of solving for $t_C$, $t_M$, $t_Y$. The usefulness of the initial data tabulation resides in the fact that the uniqueness of the tabulation works in both directions.

Thus the measured C, M, Y values can be simply read out from the tabulation in response to desired values of $t_C$, $t_M$, $t_Y$. Moreover, intermediate values of the nominal C, M, Y data are available through interpolation. Accordingly each needed value of C, M or Y for a particular color will be inferred directly, through the tabulation, by a corresponding specified value of $t$.

(c) Nonideal behavior of colorants—Interpretation of the sensor data proceeds by construing the common response 151 (FIG. 5) in the red and green channels $\underline{r}$, $\underline{g}$ as representing cyan. Similarly, the common response 152, 153 in the red and blue channels $\underline{r}$, $\underline{b}$ is construed as representing magenta, and the common sensor response 154 in the green and blue channels $\underline{g}$, $\underline{b}$ as representing yellow. Imperfections in these assumptions are discussed below.

The invention seeks to determine which amount of each colorant is needed to achieve a neutral composite black (cK). If inks actually behaved ideally in the sense that coloring effects were confined to respective nonoverlapping sensor channels—as described in the preceding paragraph—then measuring only the primaries (CMY) and black (K) would suffice.

Figure 6:
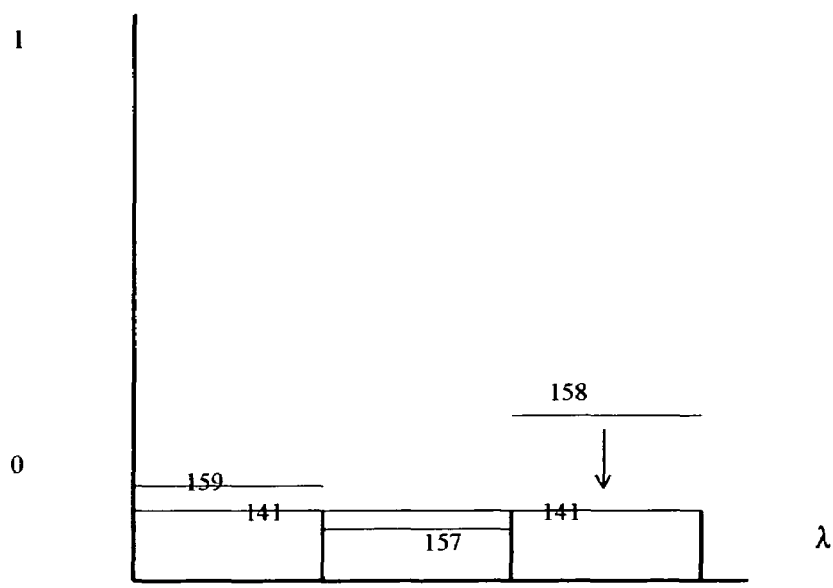
FIG. 6 is a like graph but showing how the behavior of each primary in a nominally black composite printout is adjusted, according to the invention, to make the composite actually match true black.
Figure 7:
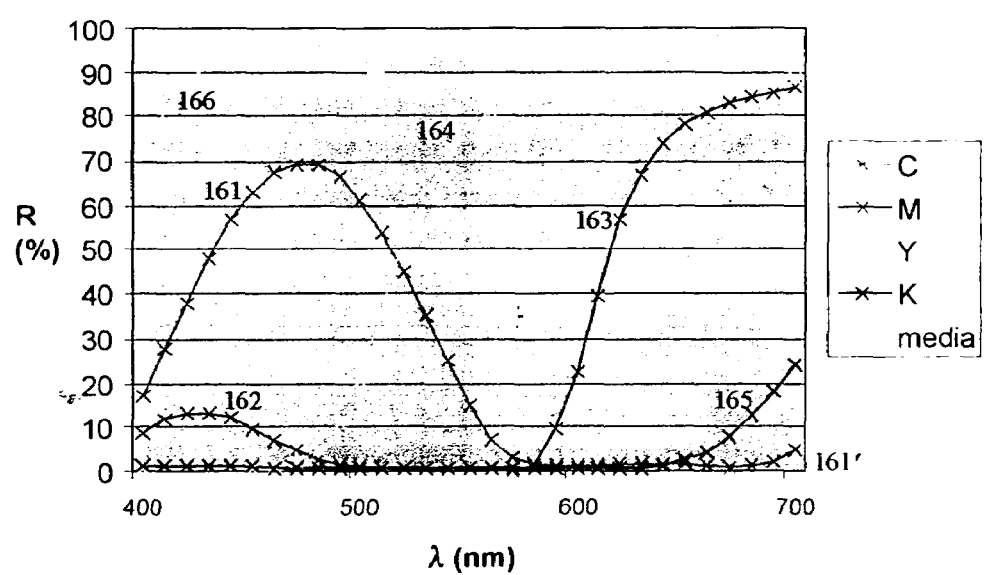
FIG. 7 is a graph of reflectivity as a function of wavelength for each primary and the bare printing medium.

In that case, the response 156, 157, 158 (FIG. 6) of each primary (CMY) would simply be adjusted to produce the same response 141 as the black colorant. Unfortunately inks do not behave in that way—as seen from the fact that the primary response curves 161–164 (FIG. 7) are not rectangular functions at all but rather continuous curves with quite different behavior in different spectral regions.

Figure 5:
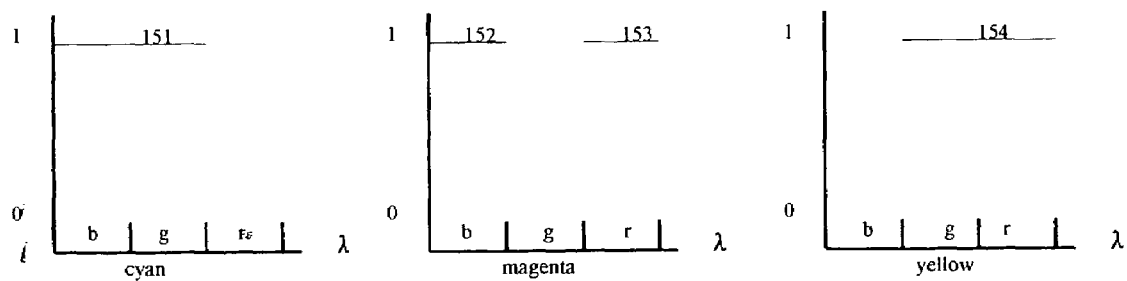
FIG. 5 is a conceptual graph showing how the three primary colorants influence (ideally) the three sensor channels.

For instance the cyan reflectivity 161 is not equal in the blue and green as suggested 151 in FIG. 5, but instead peaks in the blue and falls with increasing wavelength through the green. It even displays minor return 161' in the far red.

Analogously the magenta reflectivity 162, 163 is not equal in the blue and red as suggested 152, 153 in FIG. 5. Instead it has by far its major return 162 in the red and only a relatively quite small subsidiary return 162 in the blue.

Still further, yellow reflectivity 164 is not equal in the green and red as suggested 154 in FIG. 5, but instead falls off in the lower end of the green band. It returns quite significantly into the blue, where in ideal terms it should be substantially nonreflective.

Not even the reflectivity 166 of the printing medium is wholly as might be classically expected, since its reflectivity falls abruptly in the lower end of the blue. To complicate matters still further the reflectivity of pure, true black ink is anomalously very substantial in the far red—exceeding, for instance, that of the magenta peak 162 in the blue.

(d) Model equations—To compensate these cross-channel and other nonideal effects, we build a model to describe actual ink behavior. At the outset a general multiplicative expression may be noted, for use in relation to both secondary colorants and black (repeating equation [1]):

$$H(\underline{t},\underline{n},\underline{a}) = D(\underline{t},\underline{n}) \cdot E(\underline{t},\underline{n}) \cdot \ldots \cdot F(\underline{t},\underline{n}). \quad [1']$$

Here H is a hybrid or composite color printed by use of at least two constituent colors,
  D is one of the constituent colors,
  E is another of the constituent colors,
  "..." represents possible further constituent colors of the "at least two",
  F is a correction factor,
  $t$ is a tonal level at which H, D, E and "..." are evaluated,
  $\underline{n}$ is a sensor channel at which all the above are evaluated, and
  $\underline{a}$ is a scaling factor that relates overall range of the hybrid color with overall range of the constituent colors.

In some of the expressions, $H=cK$, $D=S_1$ and $E=S_2$, where cK is composite black and $S_1$ and $S_2$ are secondaries. In others of the expressions, $H=S$, $D=P_1$ and $E=P_2$, where S is a secondary and $P_1$ and $P_2$ are primaries; in these latter expressions, $\underline{a}=1$.

Now to demonstrate application of this general expression to the several cases involved in accordance with the invention, consider first forming the secondaries—with the correction factor $F(n)=\alpha_N$:

$$R(\underline{t},\underline{r}) = M(\underline{t},\underline{r}) \cdot Y(\underline{t},\underline{r}) \cdot \alpha_R(t)$$
$$G(\underline{t},\underline{g}) = C(\underline{t},\underline{g}) \cdot Y(\underline{t},\underline{g}) \cdot \alpha_G(t)$$
$$B(\underline{t},\underline{b}) = C(\underline{t},\underline{b}) \cdot M(\underline{t},\underline{b}) \cdot \alpha_B(t), \quad [7]$$

where
  R, G and B are the colors being formed as ink combinations,
  M, Y and C are the constituent colors,
  $\alpha$ is the correction factor,
  $t$ is a tonal level (equivalently, an ink percentage) at which M, Y, C and $\alpha$ are evaluated, and
  $\underline{r}$, $\underline{g}$ and $\underline{b}$ are the sensor channels at which all the above are evaluated.

For example $C(0.7, g)$ means the sensor reading in the green channel on a nominally 70% patch of cyan.

Preliminary to finding a solution to the overall modeled system—as will be shown below—the foregoing three expressions are rearranged to solve for the three correction factors $\alpha$:

$$\alpha_R(t) = \frac{R(t, r)}{M(t, r) \cdot Y(t, r)} \quad [8]$$

$$\alpha_G(t) = \frac{G(t, g)}{C(t, g) \cdot Y(t, g)}$$

-continued
$$\alpha_B(t) = \frac{B(t, b)}{C(t, b) \cdot M(t, b)}.$$

Thus a numerical value for the correction factor $\alpha_G(0.7)$ is obtained from the three sensor measurements G(0.7, g), C(0.7, g) and Y(0.7, g).

In some situations there is a small complication concerning the tonal values (or color percentage) to which the correction factors α apply. In the determination of those factors, only one tonal value is involved—because the same tonal value is specified for both e.g. magenta and yellow in forming red; and that same tonal value is attributed to the resulting red patch as well.

In a more-advanced model, however, as will be seen, it can be preferable to estimate red from different percentages of magenta and yellow—and analogously for the other secondaries. In order to simplify the model, nonetheless, each correction factor α is computed unidimensionally, and its index is the average of the tonal values of its two constituents:

$$\alpha(t_M, t_Y) = \alpha\left(\frac{t_M + t_Y}{2}\right). \qquad [8]$$

A more complex model would yield better results but would require more samples. To simplify the notation, in most of the remainder of this discussion when referring to the correction factors α no sensor channel will be specified for the tonal values. That is, for example correction factors $\alpha_G(0.7)$, $\alpha_R(0.3)$ and $\alpha_B(0.9)$ will all be written simply $\alpha(0.7)$, $\alpha(0.3)$ and $\alpha(0.9)$ respectively.

The foregoing discussion explores application of a general expression for a composite color H to composite secondary colors. Next consider application of the same general expression to composite grays:

$$cK(t, \underline{r}) = C(t, \underline{r}) \cdot R(t, \underline{r}) \cdot \beta_R(t) \qquad [9]$$
$$cK(t, \underline{g}) = M(t, \underline{g}) \cdot G(t, \underline{g}) \cdot \beta_G(t)$$
$$cK(t, \underline{b}) = Y(t, \underline{b}) \cdot B(t, \underline{b}) \cdot \beta_B(t),$$

where
- cK is composite black, formed as a three-colorant combination of cyan, magenta and yellow (CMY),
- C, M and Y are those constituent primary colors,
- R, G and B are red, green and blue as two-colorant combinations of those primaries,
- β is a correction factor in each channel respectively,
- t is a tonal level (equivalently, an ink percentage) at which C, M, Y and β are evaluated, and
- $\underline{r}$, $\underline{g}$ and $\underline{b}$ are the sensor channels at which all the above are evaluated.

Analogously to the preliminary step in the primary-colorant case discussed earlier, the foregoing three expressions are rearranged to solve for the three correction factors β:

$$\beta_R(t) = \frac{cK(t, r)}{C(t, r) \cdot R(t, r)} \qquad [10]$$
$$\beta_G(t) = \frac{cK(t, g)}{M(t, g) \cdot G(t, g)}$$
$$\beta_B(t) = \frac{cK(t, b)}{Y(t, b) \cdot B(t, b)}.$$

Here as with the α derivations discussed earlier, actual numerical values can now be obtained for β, to be inserted into final expressions for t. Here, to avoid circular definition in each channel, the same tone-definition issue discussed above for α calculations recurs; for example:

$$\beta_G(t_M, t_G) = \beta_G\left(\frac{t_M + t_G}{2}\right) = \beta_G\left(\frac{t_M + \frac{t_C + t_Y}{2}}{2}\right). \qquad [11]$$

(e) Condition—Solution of the system of equations requires one further constraint. The constraint to be imposed is simply that composite black cK matches true black K at all bands, or more precisely all bands that can be measured—in other words, in all the sensor channels.

In the notation introduced above, this condition appears thus:

$$cK(\underline{t}, \underline{r}) = K(a, \underline{t}, \underline{r}) \qquad [12]$$
$$cK(\underline{t}, \underline{g}) = K(a, \underline{t}, \underline{g})$$
$$cK(\underline{t}, \underline{b}) = K(a, \underline{t}, \underline{b})$$

for all $\underline{t}$—but usually represented only as a sampling of e.g. roughly seventeen of the tonal values $\underline{t}$. This expression includes the previously defined scaling factor $\underline{a}$ that interrelates the overall ranges of the composite color (here cK) and its constituent colors (here K).

(f) Ranging adjustment—The scaling factor $\underline{a}$ is necessary because of the range problem mentioned in sub-section 2, "COMPLETE SAMPLING", above. Other, more complex functions could be used, but a simple factor is sufficient.

Figure 8:
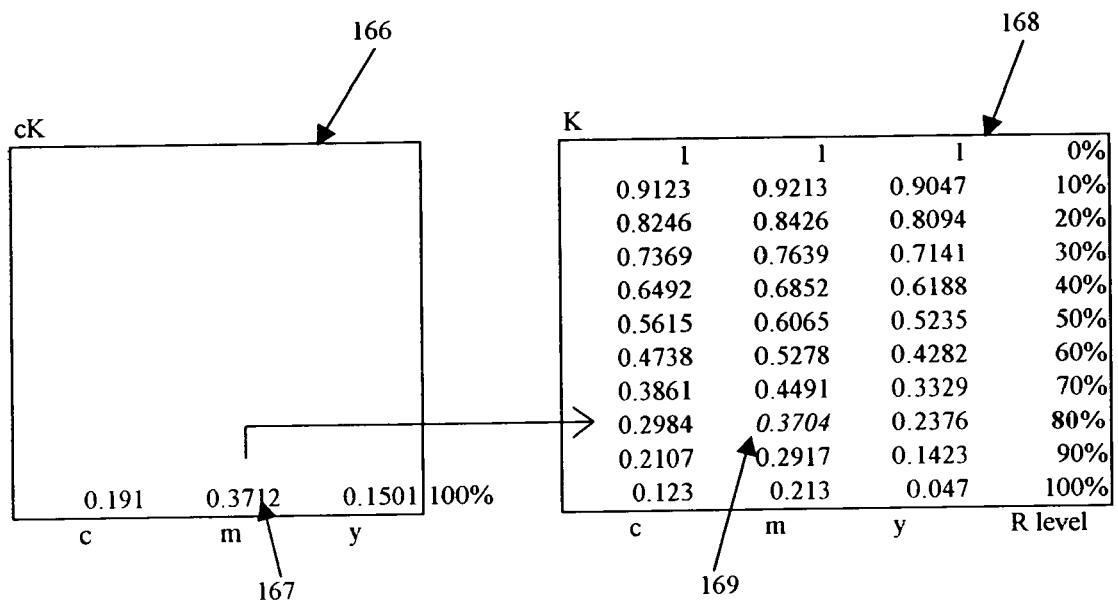
FIG. 8 is a numerical example, in the form of a tabulation, showing how the FIG. 2 resealing is completed.

A single, unitary value of a for use throughout the system is found empirically. This is done by comparing the darkest available data row in the composite-black (cK) measurement tabulation 166 (FIG. 8)—namely, one-hundred percent of all three primaries—with the full true-black (K) measurement tabulation 168.

As demonstrated by the numerical example in the illustration, higher percentages ($\underline{t}$) of true-black (K) ink correspond to lower reflectance values C, M, Y. At the bottom of the true-black tabulation 168, these reflectance values approach zero.

The darkest available row in the composite-black (cK) tabulation 166 typically is less dark (i.e. has a higher reflectance value) than the true-black (K) tabulation 168, in at least one column (C, M or Y). In the example, that less-dark entry 167 is the magenta value "0.3712", which is much higher than the true-black one-hundred-percent entry "0.213"; and in fact also higher than the ninety-percent magenta entry "0.2917".

From these observations it will now be clear that it would be fallacious to attempt to match one-hundred percent of composite black with one-hundred percent of true black. The maximum composite-black reflectance is even just slightly higher than the eighty-percent magenta value 169, which appears as "0.3704".

This eighty-percent true-black entry 169, however, is a rather close match to the hundred-percent composite-black entry 167. Thus for purposes of the example the desired scaling factor may be set to $\underline{a}$=0.8 (i.e. eighty percent).

Those skilled in the field will appreciate that a more precise value of $\underline{a}$ if desired can be obtained either by iterated printing and measurement of a test pattern with finer resolution, or by interpolation. In any event, given the determined value of the scaling factor $\underline{a}$, the next step is to complete the calibration.

(g) Solution—Linking the above-stated "condition" with the composite-black model yields:

$$cK(\underline{t}, \underline{r}) = K(\underline{a}, \underline{t}, \underline{r}) = C(\underline{t}, \underline{r}) \cdot R(\underline{t}, \underline{r}) \cdot \beta_R(\underline{t}) \quad [13]$$
$$cK(\underline{t}, \underline{g}) = K(\underline{a}, \underline{t}, \underline{g}) = M(\underline{t}, \underline{g}) \cdot G(\underline{t}, \underline{g}) \cdot \beta_G(\underline{t})$$
$$cK(\underline{t}, \underline{b}) = K(\underline{a}, \underline{t}, \underline{b}) = Y(\underline{t}, \underline{b}) \cdot B(\underline{t}, \underline{b}) \cdot \beta_B(\underline{t}).$$

Discarding the left-hand member of this three-way equality and substituting the previously determined modeling expressions for the secondaries R, G, B—

$$K(\underline{a}, \underline{t}, \underline{r}) = C(\underline{t}, \underline{r}) \cdot M(\underline{t}, \underline{r}) \cdot Y(\underline{t}, \underline{r}) \cdot \alpha_R(\underline{t}) \cdot \beta_R(\underline{t}) \quad [14]$$
$$K(\underline{a}, \underline{t}, \underline{g}) = M(\underline{t}, \underline{g}) \cdot C(\underline{t}, \underline{g}) \cdot Y(\underline{t}, \underline{g}) \cdot \alpha_G(\underline{t}) \cdot \beta_G(\underline{t})$$
$$K(\underline{a}, \underline{t}, \underline{b}) = Y(\underline{t}, \underline{b}) \cdot C(\underline{t}, \underline{b}) \cdot M(\underline{t}, \underline{b}) \cdot \alpha_B(\underline{t}) \cdot \beta_B(\underline{t}).$$

Dividing through each of these remaining equations to isolate C, M, Y produces these expressions for each primary as a function of desired tonal level—and the other primaries:

$$C(t, r) = \frac{K(a, t, r)}{M(t, r) \cdot Y(t, r) \cdot \alpha_R(t) \cdot \beta_R(t)} \quad [15]$$
$$M(t, g) = \frac{K(a, t, g)}{M(t, g) \cdot Y(t, g) \cdot \alpha_G(t) \cdot \beta_G(t)}$$
$$Y(t, b) = \frac{K(a, t, b)}{M(t, b) \cdot Y(t, b) \cdot \alpha_B(t) \cdot \beta_B(t)}.$$

This is the three-equation/three-variable system to be solved.

As mentioned earlier, ultimately the variables to be found are the numerical values of $\underline{t}_N$ (where N=R, G or B) which the printing device must invoke to obtain desired composite-black neutrality at some corresponding nominal tonal value $\underline{t}_K$ of desired black.

These numerical values of $\underline{t}_N$, however, are best reached by finding their associated C, M and Y through solution of the equations just above. Then, as also mentioned earlier, the needed $\underline{t}_N$ are simply inferred (read) from the tabulation—with interpolation as appropriate.

In much of this discussion, various subindices have been omitted to simply the presentation. It is now helpful, however, to display the above three expressions with all the subindices more explicitly specified as follows.

$$C(t_C, r) = \frac{K(a, t, r)}{M(t_M, r) \cdot Y(t_Y, r) \cdot} \quad [16]$$
$$\alpha_R\left(\frac{t_M + t_Y}{2}\right) \cdot \beta_R\left(\frac{t_C + \left(\frac{t_M + t_Y}{2}\right)}{2}\right)$$

$$M(t_M, g) = \frac{K(a, t, g)}{C(t_C, g) \cdot Y(t_Y, g) \cdot}$$
$$\alpha_G\left(\frac{t_C + t_Y}{2}\right) \cdot \beta_G\left(\frac{t_M + \left(\frac{t_C + t_Y}{2}\right)}{2}\right)$$

$$Y(t_Y, b) = \frac{K(a, t, b)}{M(t, b) \cdot Y(t, b) \cdot}$$
$$\alpha_B\left(\frac{t_C + t_M}{2}\right) \cdot \beta_B\left(\frac{t_Y + \left(\frac{t_C + t_M}{2}\right)}{2}\right)$$

where:
- $\alpha$, $\beta$ are the model correction factors found or estimated from the measured values, as exhibited earlier,
- $t_C$, $t_M$, $t_Y$ are the tonal values (color percentages) of cyan, magenta and yellow—i.e., the ultimately needed variables,
- $\underline{a}$ is the resealing factor,
- $\underline{t}$ is the tonal value of the grayscale for which $\underline{t}_C$, $\underline{t}_M$, $\underline{t}_Y$ are sought,
- K are true-black as measured from the test pattern, and
- C, M, Y are chromatic primaries, also as measured.

A way to complete the solution is iteratively—for instance, first find the C($\underline{t},\underline{r}$), given the initially measured M and Y. With this first-found value of C($\underline{t},\underline{r}$), the next step is to find (directly from the line-sensor data as described above) the tonal value $\underline{t}_C$ of cyan that is needed to provide a neutral gray.

Next the procedure goes to the next equation, the equation for M, again using the initially measured Y but now with the newly estimated C—and then to the third equation, the equation for Y, now inserting both the new C and M. This round is then iterated until values converge to the desired accuracy.

The order of the equations can be changed to reach convergence more quickly. In general the best sequence is Y, then C and then M—but in practice the preferred order depends on the particular ink set in use.

(h) Process summary—The foregoing discussion shows that the invention is practiced by these steps:
1. print ramps (C, M, Y, R, G, B, cK, K),
2. measure ramps with each LED of sensor,
3. find scaling factor $\underline{a}$ from data,
4. set up model ($\alpha$, $\beta$) with the sensor data,
5. find new C, M, Y from equations,
6. iterate to reach desired accuracy, and
7. find $\underline{t}_C$, $\underline{t}_M$, $\underline{t}_Y$ from data, for each C, M, Y.

(i) Fine tuning—The search can be further refined if conducted in several printing passes, if there is a need for finer accuracy. This iteration can be performed in at least these ways:

The model pattern can be printed once again, but this time all ramps are printed with the correction found in the first effort—so that cK grays are closer to neutral at the outset. The process then continues as before, and the new color-correction values are linked with those found in the first attempt.

Alternatively the complete-sampling and model-based searches can be combined. Preferably the search is begun with the modeling, to obtain gray-balancing functions as above. Then taking the solutions as centerpoints, a complete-sampling search is performed with very small increments, such as for example one percent.

(j) Contracted gamut—Modeling as described above measures primaries and secondaries, i.e. fully saturated colorants. This approach has the benefits of simplicity and considering the full gamut.

Figure 9:
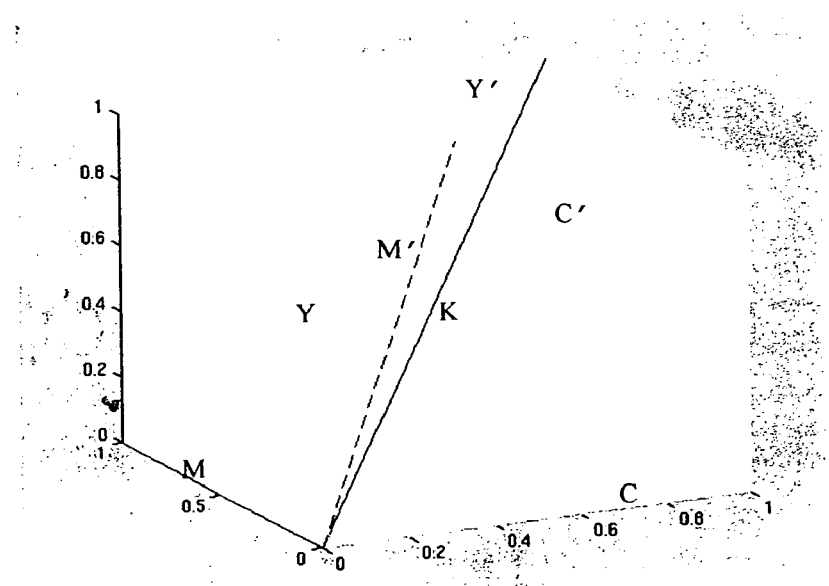
FIG. 9 is a graph of the above-introduced contraction principle of the invention, diagramed in CMY space, with the solid and dashed colored lines C, M, Y, C', M' and Y' being the original and modified axes respectively—thus showing how the axes are shrunk, in terms of the angle of deviation.

The sampled space can be contracted transversely, however, to probe at much finer resolution the region nearest the gray axis. One way to implement this strategy is to perform a simple change of base—in other words, to define $C'=\underline{b}_C C$ (FIG. 9), $M'=\underline{b}_M M$, $Y'=\underline{b}_Y Y$, $R'=\underline{b}_R R$, $G'=\underline{b}_G G$, $B'=\underline{b}_B B$.

The illustration is a diagram of CMY space. The solid colored lines C, M, Y are the conventional orthogonal axes, and the dashed colored lines C', M' and Y' are modified axes which have been, so to speak, "shrunk" or contracted—so that they are closer to the gray axis G, which appears as a solid gray line.

The parameter represented is how the axes are shrunk, in terms of the angle of deviation. The angle of contraction is an angle in the plane that contains the primary axis (e.g. C) under consideration and the gray axis G.

Orthogonal axes would be shrunk zero degrees, while fully shrunk axes would be forty-five degrees. All values intermediate between those are possible.

The change of base should be understood as very general; hence the quantities $\underline{b}$ are preferably vectors, or in the alternative the change of base may be parametrized with $\underline{b}$ in order to contract more less (in which case $\underline{b}$ may be treated as scalar).

The several scaling vectors $\underline{b}$ may be equal if preferred. On the other hand, if desired the new axes C', M'and Y' (FIG. 9) can be parametrized to shrink more or less depending on the kind of medium etc. for which the calibration is to apply.

For $|\underline{b}|>1$ the effect is to consider washes, i.e. less-saturated mixtures, of the primaries and secondaries. Secondaries furthermore are now the composition of the newly defined primaries, e.g. B'=C'+M'.

The modeling equations described above are now applied in exactly the same way as with the conventionally defined base. Once the solution is found, in terms of C'M'Y', the inverse base change is applied to express the results in terms of conventional CMY.

4. Mechanical and Program/Method Features

The invention is amenable to implementation in a great variety of products. It can be embodied in a printer/plotter that includes a main case 1 (FIG. 10) with a window 2, and a left-hand pod 3 which encloses one end of the chassis. Within that enclosure are carriage-support and -drive mechanics and one end of the printing-medium advance mechanism, as well as a pen-refill station with supplemental ink cartridges.

The printer/plotter also includes a printing-medium roll cover 4, and a receiving bin 5 for lengths or sheets of printing medium on which images have been formed, and which have been ejected from the machine. A bottom brace and storage shelf 6 spans the legs which support the two ends of the case 1.

Just above the print-medium cover 4 is an entry slot 7 for receipt of continuous lengths of printing medium 4. Also included are a lever 8 for control of the gripping of the print medium by the machine.

A front-panel display 211 and controls 212 are mounted in the skin of the right-hand pod 213. That pod encloses the right end of the carriage mechanics and of the medium advance mechanism, and also a printhead cleaning station. Near the bottom of the right-hand pod for readiest access is a standby switch 214.

Within the case 1 and pods 3, 213 a cylindrical platen 241 (FIG. 11)—driven by a motor 242, worm and worm gear (not shown) under control of signals from a digital electronic processor 71—rotates to drive sheets or lengths of printing medium 4A in a medium-advance direction. Print medium 4A is thereby drawn out of the print-medium roll cover 4.

Meanwhile a pen-holding carriage assembly 220 (FIGS. 11 and 12) carries several pens 223–226 (FIG. 11) back and forth across the printing medium, along a scanning track—perpendicular to the medium-advance direction—while the pens eject ink. As mentioned earlier, this is one but not the only form of incremental-printing apparatus, an alternative being use of a page-wide pen array with relative motion in relation to the full length of the printing medium. (As will be understood, the term "scan" is also used in describing motion of a measuring sensor over the printing medium, most usually along the medium-advance direction.)

For simplicity's sake, only four pens are illustrated; however, as is well known a printer may have six pens or more, to hold different colors—or different dilutions of the same colors—as in the more-typical four pens. The medium 4A thus receives inkdrops for formation of a desired image, and is ejected into the print-medium bin 5. A calorimetric image sensor 251, quite small, rides on the carriage with the pens.

A very finely graduated encoder strip 233, 236 (FIG. 12) is extended taut along the scanning path of the carriage assembly 220 and read by another small automatic opto-electronic sensor 237 to provide position and speed information 237B for the microprocessor. One advantageous location for the encoder strip is shown in several of the earlier cross-referenced patent documents at 236, immediately behind the pens.

A currently preferred position for the encoder strip 233 (FIG. 11), however, is near the rear of the pen-carriage tray—remote from the space into which a user's hands are inserted for servicing of the pen refill cartridges. For either position, the encoder-strip sensor 237 is disposed with its optical beam passing through orifices or transparent portions of a scale formed in the strip.

The pen-carriage assembly 220, 220' (FIGS. 11 and 12) is driven in reciprocation by a motor 231—along dual support and guide rails 232, 234—through the intermediary of a drive belt 235. The motor 231 is under the control of signals from digital processors 71.

Naturally the pen-carriage assembly includes a forward bay structure 222 for the pens—preferably at least four pens 223–226 holding ink of four different colors respectively. Most typically the inks are yellow in the leftmost pen 223, then cyan 224, magenta 225 and black 226. As a practical matter, chromatic-color and black pens may be in a single printer, either in a common carriage or plural carriages.

Figure 10:
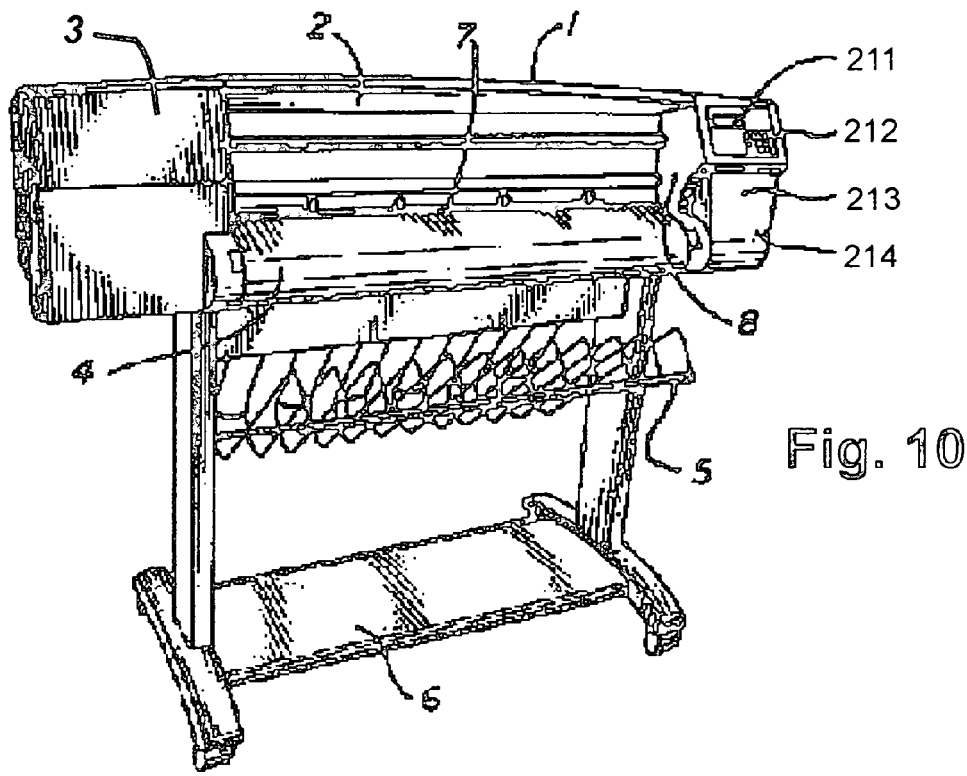
FIG. 10 is a perspective drawing of the invention as incorporated into a representative printing device that is a large-format printer/plotter.

Also included in the pen-carriage assembly 220, 220' is a rear tray 221 carrying various electronics. FIGS. 10 and 11 most specifically represent a system such as the Hewlett Packard printer/plotter model "DesignJet 1000", which product does not include the present invention. These drawings, however, also illustrate certain embodiments of the invention, and—with certain detailed differences mentioned below—a printer/plotter that includes preferred embodiments of the invention.

Before further discussion of details in the block diagrammatic showing of FIG. 12, a general orientation to that drawing may be helpful. Most portions 70, 73–78, 66 across the lower half of the diagram, including most 4A–251 of the printing stage at far right, are generally conventional and represent the context of the invention in an inkjet printer/plotter.

The top portion 62–65, 80–85 of the drawing and certain parts 251', 251" of the printing stage represent the present invention. Given the statements of function presented in this document, an experienced programmer of ordinary skill in this field can prepare suitable programs for operation of all the circuits.

The pen-carriage assembly is represented separately at 220 when traveling to the left 216 while discharging ink 218, and at 220' when traveling to the right 217 while discharging ink 219. It will be understood that both 220 and 220' represent the same pen carriage.

The previously mentioned digital processor 71 provides control signals 220B to fire the pens with correct timing, coordinated with platen drive control signals 242A to the platen motor 242, and carriage drive control signals 231A to the carriage drive motor 231. The processor 71 develops these carriage drive signals 231A based partly upon information about the carriage speed and position derived from the encoder signals 237B provided by the encoder 237.

(In the block diagram almost all illustrated signals are flowing from top toward bottom and left toward right. The exceptions are the information 237B fed back from the codestrip sensor 237, the image-reflectance measurement profile data 65 fed back from the calorimetric sensor 251, and the scaling information 172—all as indicated by the associated leftward arrows.)

The codestrip 233, 236 thus enables formation of color inkdrops at ultrahigh precision during scanning. This precision is maintained in motion of the carriage assembly 220 in each direction—i.e., either left to right (forward 220') or right to left (back 220).

New image data 70 are received 191 into an image-processing stage 73, which may conventionally include a contrast and color adjustment or correction module 76 and rendition and scaling modules 74, 77, 77'. Most commonly, scaling (if any) is performed in conjunction with rendition 75.

Information 193 passing from the image-processing module 73 next enters a printmasking module 76. This generally includes a stage 77 for specific pass and nozzle assignments.

Integrated circuits 71 may be distributive—being partly in the printer, partly in an associated computer, and partly in a separately packaged raster image processor. Alternatively the circuits may be primarily or wholly in just one or two of such devices.

These circuits also may comprise a general-purpose processor (e.g. the central processor of a general-purpose computer) operating software such as may be held for instance in a computer hard drive, or operating firmware (e.g. held in a ROM 75 and for distribution 66 to other components), or both; and may comprise application-specific integrated circuitry. Combinations of these may be used instead.

As set forth above, images to be printed and scanned to establish the modifications prescribed by the present invention may be representative area-fill images of different colors, for reading by the optical sensor 251 to generate calibration data. For generation of such test images, the apparatus of the invention includes—in the integrated-circuit section 71 (FIG. 12)—printing means 62 that generate control signals 80 for operation of the final output stage 78. These signals drive the printing stage seen at right.

In addition to the simple formatting instructions necessary merely to define a geometrical pattern of test patches 101, 111, 121–25, 131–35 (FIG. 1)—or alternatively 171–74, 176–79 (FIG. 4)—the control signals 80 include a series of different calorimetric parameters for test, as appropriate for establishing the multiple colors of the patches respectively.

Figure 1:
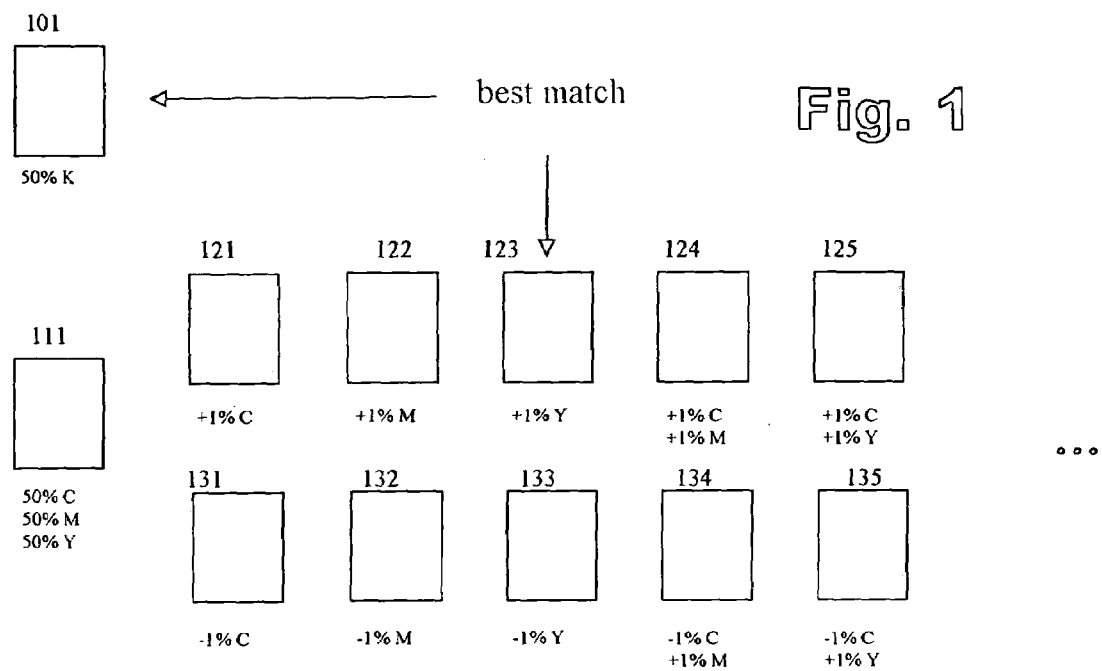
FIG. 1 is a partly diagrammatic showing of color patches for calibrating a single tonal level in a composite-black neutral ramp, by comparison with a true-black ramp.
Figure 2:
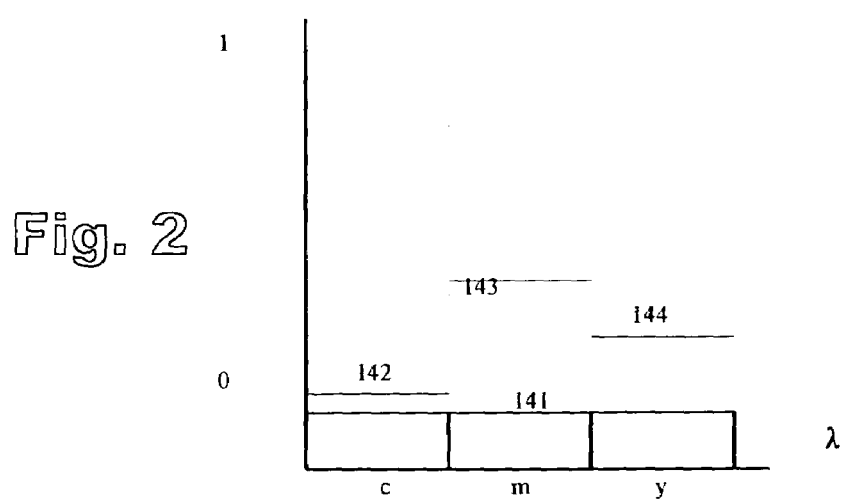
FIG. 2 is a graph of representative sensor responses in three channels, for both composite and true black, at a common nominal tonal level—for preliminary determination of needed rescaling.

Such a series of parameters typically defines the colorant deposition corresponding to the nominal ramp colors, and in the case of the sampling method of FIG. 1 also includes a sequence of subtly differing color commands defining the variations about each nominal color. Each value is duly implemented by the final output stage 78 and its output signals 220B, 231A, 242A. These signals are further implemented, in printing of the test images, by the movements of the advance motor 242, drive 241 and medium 4A.

A small automatic optoelectronic sensor 251 rides with the pens on the carriage and is directed downward to obtain data about color. More specifically, the sensor measures color in the test patches, for purposes of the adjustments set forth earlier in this document.

Ramp-measurement interpreting means 82 receive measurement data 65 returned from the sensor 251. In the case of the optimization embodiments, these interpreting means 82 include means for correlating these calorimetric data 65 with the phase of the waveband-selection signals 87 as well as the calorimetric components of the previously discussed output-stage control signals 80.

Based upon the calorimetric data 65 and correlations, the ramp-measurement interpreting means 82 generate signals 83 for controlling the compensation means 84—which in turn produce signals 86 that adjust the otherwise generally conventional color-correction module 74. Through refined cooperation of these several modules, the compensation means 84 are able to minimize chroma in nominally neutral image features—and also, as explained earlier, to trim up the reproduction of color throughout the gamut of the printing device.

More specifically, the compensation means 84 include a calculation stage 85 that reduces chroma to roughly 2.5 $\Delta$E or less. The notation $\Delta$E represents color difference in three-dimensional color space, particularly the perceptual CIELA*B* space.

As set forth in other patent documents, the same or related data 65 can be used for control of other parameters. These may include printmode; print-medium advance speed and stroke; scan velocity; inkdrop energies, sizes and velocities; depletion, propletion and discretionary-dotting ratios; balance point between randomization vs. granularity; and also nozzle weighting distributions.

The sensor 251 signals are coordinated (not shown) with movements of the carriage and advance mechanism during sensing. These signals are also coordinated with operation of ramp-measurement controlling means 81 that generate—among other control information—signals 87 for controlling the lamps 251' (FIG. 12) or wavelength-differentiation unit 88 (FIG. 13).

In particular the lamps 251' advantageously take the form of red, green and blue light-emitting diodes (LEDs) R, G, B respectively. These diodes are energized by their control signals 87 to produce specifically timed light pulses 251" for illuminating the test pattern (FIG. 1 or 4) on the printing medium 4A—and thereby reflecting light in specified wavebands into the sensor 251.

This enables discrimination of the reflected colors as discussed earlier. In practice the lamps 251' are typically mounted within the housing of the sensor 251, and thus are carried transversely across the printing medium 4A by the carriage 220—as motivated 235 by the motor 231 and its control signals 231A. Propagation of the light pulses 251" to the printing medium accordingly is almost completely within the protected environment of the sensor housing.

In an alternative illumination and sensing arrangement, the light source is instead a broadband single source 251'BB (FIG. 13), which emits broadband light 251"BB toward the test pattern on the medium 4A. In the illustrated arrangement this light is allowed to illuminate the test pattern, and the reflected light passes to a wavelength differentiator 88.

The latter may be a controlled filter set (e.g. with a rotating chopper), or a controlled birefringent dispersive device, or a controlled diffractive unit, or any other module that spatially, temporally and/or absorptively, or otherwise separates illumination from the spectral bands of interest, within the broadband illumination 251"BB. Selected light 251"S passes to the sensor 251.

To establish which waveband is being received by the sensor 251, or by particular elements within the sensor 251, the differentiator 88 is controlled by the signals 87 from the ramp-measurement controlling means 81. The sensor signals 65 proceed as before to the interpreting means 82. In another alternative configuration the differentiator 88 is located at a suitable point 89 in the illumination path.

Any of these versions of the illumination and sensing subsystem thereby readily performs optical measurements 65, 82 (FIG. 12) of the printed test images. Suitable algorithmic control is well within the skill of the art, guided by the discussions here.

Figure 14:
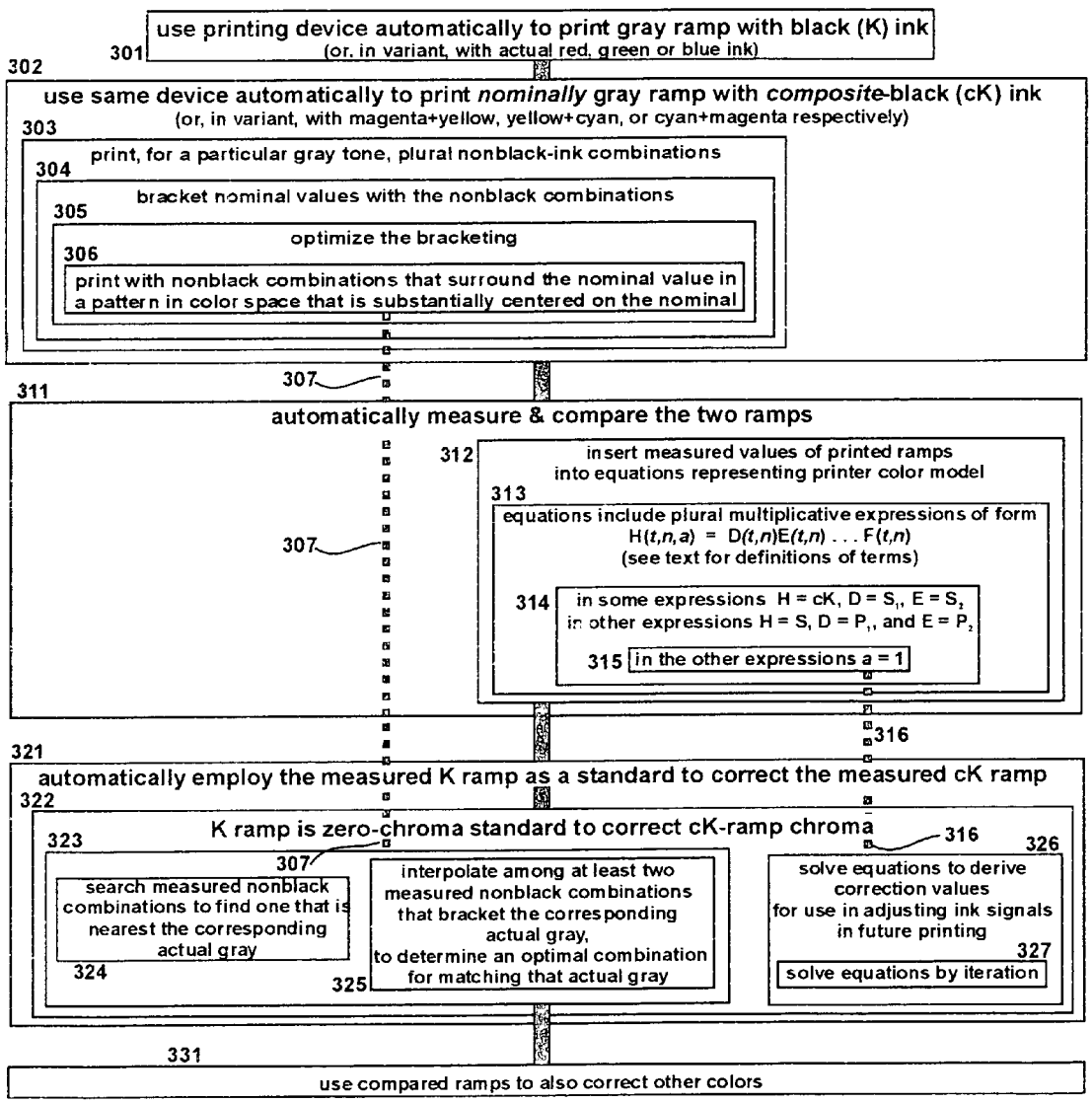
FIG. 14 is a flow chart for a method according to the invention.
Figure 15:
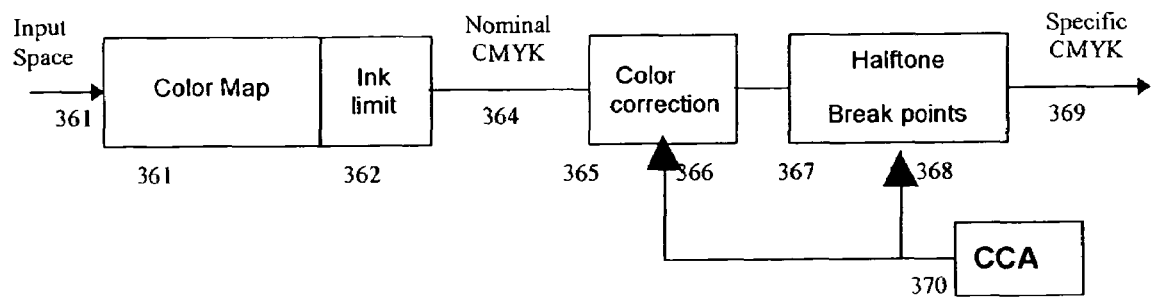
FIG. 15 is a high-level flow chart indicating the relationship between a color-calibration algorithm (CCA), a color-correction stage and a rendition stage.
Figure 16:
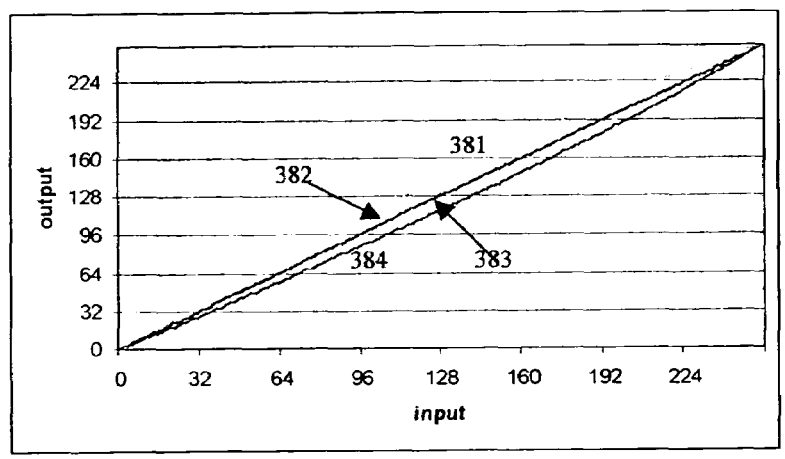
FIG. 16 is an exemplary color-correction mapping.

Method aspects of the invention may be conceptualized as preferably including five distinct major steps 301, 302, 311, 321 and 331 (FIG. 14). All these operate automatically, and as will be understood such operation may begin with reading instructions 66 out of a nonvolatile memory 72 (FIG. 12) for control of the several integrated-circuit modules. To the extent that some functions may be effected in an ASIC, however, no such reading step is required as such; simply powering up the circuit initiates operation of whatever functions the unit has been constructed to perform.

The first major function 301 includes using the printing device to print a gray ramp with a single black ink. In the secondary-calibrating variant or aspect of the invention, actual red, green or blue ink may be used instead.

The second major function 302 includes using the same device to print a nominally gray ramp with composite-black ink—or, for a secondary-calibrating facet or variant, with two-primary nominal approximations to the desired secondaries. This major step 302 is then followed by a further major step 311 of automatically measuring and comparing the two ramps.

Next is a fourth major step 321 of employing the measured black ramp as a standard to correct the measured composite-black ramp—and this preferably includes a chroma-correction operation 322. A fifth such step 331 includes using the compared ramps to also correct other colors.

The two main methods of practicing the present invention are sampling 303–307, 322–325 and modeling 312–316, 326, 327. These alternatives are seen in the illustration as two coordinated subchannels—to the left and right respectively.

In particular, if sampling is favored then the printing step 302 involves not only printing of a unitary composite-black ramp as in the modeling case, but also the substep 303 of printing plural nonblack combinations for each gray tone to be calibrated.

Preferably this plural-combination printing substep 303 includes enough surrounding values to bracket 304 each nominal value—and this in turn preferably includes optimizing 305 the bracketing, which optimizing itself preferably includes printing combinations that surround 306 the nominal value in color space.

When this approach is employed, then after the major measuring-and-comparing step 311, the employing step 321 is coordinated 307 with the printing substeps 303–306 by the particular form 323 of the chroma-correction substep 322. More specifically, either the measured nonblack combinations are searched 324 to find one of those combinations for use, or the system interpolates 325 among measured combinations—typically those which most closely surround the target true gray.

If instead modeling is employed, then the plural nonblack-combination printing 303 is omitted—but when it is time for measurement and comparison 311, a new step of inserting 312 the measured values into equations is performed. It is this step 312, rather than the "particular form" 323 mentioned in the preceding paragraph, which is then linked 316 to a specialized substep 326 in the employing step 321—namely, the substep of solving the equations to get the correction values for later use.

In the modeling case, the value-insertion substep 312 preferably includes using 313 expressions of the form presented in equation [1], [1'] earlier—and these expressions in turn preferably take 314, 315 the special forms that are described in the text immediately following equation [1']. As also noted earlier, the solution 326 is advantageously performed by iteration 327 of the equations.

As mentioned earlier, however, the sampling and modeling regimens may be hybridized in various ways. One particularly effective strategy for doing so is first to go through the FIG. 14 method using the modeling options in the right-hand channel 312–316, 326, 327 to very closely narrow the field of search—ideally with iteration as discussed above—and then to perform one or more final rounds of search using the left-hand channel 302–307, 323.

The above disclosure is intended as merely exemplary, and not to limit the scope of the invention—which is to be determined by reference to the appended claims.

The invention claimed is:

1. A method for color-calibrating a printing device; said method comprising the steps of:
   using the printing device to print a gray ramp with black ink;
   using the same said printing device to print a nominally gray ramp with composite-black ink;
   measuring and comparing the printed black-ink gray ramp and the printed composite-black gray ramp; and
   employing the measured black-ink ramp as a standard to correct the measured composite-black ramp.

2. The method of claim 1, wherein:
   all the steps are performed automatically.

3. A method for color-calibrating a printing device; said method comprising the steps of:
   using the printing device to print a gray ramp with black ink;
   using the same said printing device to print a nominally gray ramp with composite-black ink;
   measuring and comparing the printed black-ink gray ramp and the printed composite-black gray ramp; and employing the measured black-ink ramp as a standard to correct the measured composite-black ramp;

wherein the employing step comprises treating the black-ink ramp as a zero-chroma standard to correct chroma found in the composite-black ramp.

4. The method of claim 2, further comprising the step of:

using the compared black-ink ramp and composite-black ramp to also correct other printing with composite black.

5. The method of claim 4, further comprising the step of:

using the compared black-ink ramp and composite-black ramp to also correct other colors to be printed by the printer.

6. The method of claim 2, wherein:

the using step with composite-black ink comprises printing, for a particular gray tonal level, plural combinations of nonblack inks.

7. The method of claim 1, wherein:

the using step with composite-black ink comprises printing, for a particular gray tonal level, plural combinations of nonblack inks; and the plural combinations of nonblack inks substantially bracket nominal values for the particular gray value.

8. The method of claim 7, wherein the employing step comprises:

searching the printed and measured plural combinations of nonblack inks to find a combination that is nearest the corresponding particular gray value.

9. The method of claim 7, wherein the employing step comprises:

searching the printed and measured plural combinations of nonblack inks to find at least two combinations that bracket a corresponding particular gray value; and interpolating among the at least two combinations to determine an optimal combination for matching the corresponding particular gray value.

10. The method of claim 7, wherein said printing with plural combinations of nonblack inks comprises:

optimized bracketing of the nominal values.

11. The method of claim 10, wherein:

said optimized bracketing comprises printing with said plural combinations of nonblack inks that surround the nominal value in a pattern of color values, in color space, that is substantially centered on the nominal value.

12. The method of claim 6, wherein the employing step comprises:

searching the printed and measured plural combinations of nonblack inks to find a combination that is nearest a corresponding particular gray value.

13. A method for color-calibrating a printing device; said method comprising the steps of:

using the printing device to print a gray ramp with black ink;

using the same said printing device to print a nominally gray ramp with composite-black ink;

measuring and comparing the printed gray ramps; and employing the measured black-ink ramp as a standard to correct the measured composite-black ramp; wherein:

the measuring and comparing step comprises inserting measured values of the printed gray ramps into equations representing a colorimetric model of the printer; and the employing step comprises solving the equations to derive correction values for use in adjusting ink signals in future printing.

14. The method of claim 13, wherein:

the calorimetric equations include plural expressions having the form:

$$H(t,n,a) = D(t,n) \cdot E(t,n) \cdot \ldots \cdot F(t,n),$$

wherein H is a hybrid color printed by use of at least two constituent colors,

D is one of the constituent colors,

E is another of the constituent colors,

" . . . " represents possible additional constituent colors of said at least two, F is a correction factor, $t$ is a tonal level at which H, D, E and " . . . " are evaluated, $n$ is a sensor channel at which all the above are evaluated, and $a$ is a scaling factor that relates overall range of the hybrid color with overall range of the constituent colors.

15. The method of claim 14, wherein:

in some of the expressions, H=cK, D=$S_1$ and E=$S_2$, where cK is composite black and $S_1$ and $S_2$ are secondaries; and in others of the expressions, H=S, D=$P_1$ and E=$P_2$, where S is a secondary and $P_1$ and $P_2$ are primaries.

16. The method of claim 15, wherein:

in said others of the expressions $a$=1.

17. The method of claim 13, wherein:

the equations are solved by iteration.

18. A method for automatically color-calibrating a printer; said method comprising the steps of:

using the printer to print a ramp in a particular color with actual ink of that color;

using the same said printer to print a ramp nominally in said particular color but with inks of other colors;

measuring and comparing the actual-ink printed ramp and the other-colors-inks printed ramp; and using the measured actual-ink ramp as a standard to calibrate and correct the measured other-colors-inks ramp and also to correct other printing with said other colors.

19. A method for automatically color-calibrating a printer; said method comprising the steps of:

using the printer to print a ramp in a particular color with actual ink of that color;

using the same said printer to print a ramp nominally in said particular color but with inks of other colors;

measuring and comparing the printed ramps; and using the measured actual-ink ramp as a standard to calibrate and correct the measured other-colors-ink ramp and also to correct other printing with said other colors; wherein:

said actual ink is selected from the group consisting of:

red ink, green ink, and blue ink;

and said inks of other colors are selected from the group consisting of, respectively:

magenta ink and yellow ink, yellow ink and cyan ink, and cyan ink and magenta ink.

\* \* \* \* \*

UNITED STATES PATENT AND TRADEMARK OFFICE
CERTIFICATE OF CORRECTION

PATENT NO. : 7,027,182 B1
APPLICATION NO. : 09/702929
DATED : April 11, 2006
INVENTOR(S) : Pau Soler It is certified that error appears in the above-identified patent and that said Letters Patent is hereby corrected as shown below:

In column 3, line 10, delete "calorimetric" and insert -- colorimetric --, therefor.

In column 6, line 30, delete "calorimetric" and insert -- colorimetric -- therefor.

In column 6, line 34, delete "calorimetric" and insert -- colorimetric --, therefor.

In column 6, line 60, delete "$H(t,n,a)=D(t,n)+E(t,n)\cdot F(t,n)+E'(t,n)\cdot F'(t,n)+$" and insert -- $H(t,n,a)=D(t,n)+E(t,n)\cdot F(t,n)+E'(t,n)\cdot F'(t,n)+ \ldots$ --, therefor.

In column 7, line 18, delete "calorimetric" and insert -- colorimetric --, therefor.

In column 9, line 22, delete "resealing" and insert -- rescaling --, therefor.

In column 10, line 12, delete "calorimetric" and insert -- colorimetric --, therefor.

In column 16, line 11, after "the" delete "a" and insert -- α --, therefor.

In column 18, line 27, delete "resealing" and insert -- rescaling --, therefor.

In column 20, line 29, delete "calorimetric" and insert -- colorimetric --, therefor.

In column 21, line 32, delete "calorimetric" and insert -- colorimetric --, therefor.

In column 22, line 8, delete "calorimetric" and insert -- colorimetric --, therefor.

In column 22, line 28, delete "calorimetric" and insert -- colorimetric --, therefor.

In column 22, line 30, delete "calorimetric" and insert -- colorimetric --, therefor.

In column 22, line 32, delete "calorimetric" and insert -- colorimetric --, therefor.

UNITED STATES PATENT AND TRADEMARK OFFICE
CERTIFICATE OF CORRECTION

PATENT NO. : 7,027,182 B1
APPLICATION NO. : 09/702929
DATED : April 11, 2006
INVENTOR(S) : Pau Soler Page 2 of 2

It is certified that error appears in the above-identified patent and that said Letters Patent is hereby corrected as shown below:

In column 26, line 2, in Claim 14, delete "calorimetric" and insert -- colorimetric --, therefor.

Signed and Sealed this

Twenty-sixth Day of May, 2009

JOHN DOLL
*Acting Director of the United States Patent and Trademark Office*